United States Patent [19]
Khoury et al.

[11] Patent Number: 4,641,221
[45] Date of Patent: Feb. 3, 1987

[54] THIN TAPE FOR DIELECTRIC MATERIALS

[75] Inventors: Issam A. Khoury, Southboro; Robert H. Heistand, II, East Walpole; Iwao Kohatsu, Lexington, all of Mass.

[73] Assignee: The Dow Chemical Company, Midland, Mich.

[21] Appl. No.: 761,929

[22] Filed: Aug. 2, 1985

[51] Int. Cl.$^4$ .......................... H01G 4/10; H01B 3/12
[52] U.S. Cl. .............................. 361/321; 252/62.3 BT
[58] Field of Search ............... 29/25.42; 361/311, 321, 361/320, 328; 501/136; 252/62.3 BT

[56] References Cited

U.S. PATENT DOCUMENTS

| | | |
|---|---|---|
| 1,982,778 | 12/1934 | Andersen . |
| 2,468,233 | 4/1949 | Prichard . |
| 2,486,410 | 11/1949 | Howatt . |
| 2,736,080 | 2/1956 | Walker et al. . |
| 2,759,854 | 8/1956 | Killby . |
| 2,776,898 | 1/1957 | Day et al. . |
| 2,839,419 | 6/1958 | Windover et al. . |
| 2,958,607 | 11/1960 | Windover et al. . |
| 2,965,508 | 12/1960 | Windover et al. . |
| 2,965,927 | 12/1960 | Crosby et al. . |
| 2,966,719 | 1/1961 | Park . |
| 3,004,197 | 10/1961 | Rodriguez et al. . |
| 3,070,451 | 12/1962 | Beaver et al. . |
| 3,189,978 | 6/1965 | Stetson . |
| 3,323,879 | 6/1967 | Kerstetter et al. . |
| 3,495,996 | 2/1970 | Delaney et al. . |
| 3,536,508 | 10/1970 | Short . |
| 3,565,749 | 2/1971 | Wizon . |
| 3,619,220 | 11/1971 | Maher . |
| 3,649,353 | 3/1972 | Ulrich . |
| 3,714,709 | 2/1973 | Liederbach . |
| 3,717,487 | 2/1973 | Hurley et al. . |
| 3,878,434 | 4/1975 | Voorhoeve . |
| 3,878,443 | 4/1975 | Girard et al. . |
| 4,075,681 | 2/1978 | Popowich . |
| 4,209,477 | 6/1980 | Yanagida et al. . |
| 4,220,547 | 9/1980 | Abe et al. . |
| 4,377,840 | 3/1983 | Nair . |
| 4,406,701 | 8/1983 | Yamaoka et al. . |
| 4,447,853 | 5/1984 | Tomuro et al. . |

FOREIGN PATENT DOCUMENTS 2523760 9/1983 France .
1493102 11/1977 United Kingdom .

OTHER PUBLICATIONS

Thompson, J. J., *Ceramic Bulletin*, vol. 42, pp. 480–481 (1963).
Mistler, R. E., et al., "Tape Casting of Ceramics", *Ceramic Processing before Sintering*, Chapter 30, pp. 411–447.
*J. Amer. Cer. Soc.*, vol. 49, No. 6, pp. 299–302.

*Primary Examiner*—Donald A. Griffin
*Attorney, Agent, or Firm*—Marie F. Zuckerman

[57] ABSTRACT

An improved, flexible, strong, thin precursor green tape for dielectric ceramics, the tape being prepared from ethylcellulose of specific characteristics. The tape is especially useful in the preparation of multilayer capacitors and related electronic devices.

20 Claims, No Drawings

THIN TAPE FOR DIELECTRIC MATERIALS

BACKGROUND OF THE INVENTION

The present invention relates to ceramic precursor tapes and their use in the manufacture of electronic components.

The preparation of dielectric ceramics is similar to the preparation of other ceramics in that a green, i.e., unfired, piece is first prepared and then fired to obtain a desired ceramic article. In the preparation of multilayer capacitors, preformed sheets, films or strips of green, dielectric material are coated with a pattern of an electrode ink, stacked, compressed and fired to provide a monolithic multilayer capacitor. For a given dielectric material, capacitance is a function of thinness, i.e., capacitance increases as the thickness of a dielectric layer decreases. Thus, it is possible to reduce capacitor size while simultaneously increasing the capacitance of the capacitor. Theoretically, there is almost no limit to the smallness of multilayer capacitors. However, practical size limitations exist due to the nature of green tapes and the problems associated with their handling.

The physical properties of green tapes become a critical factor in the preparation of thinner, higher capacitance, dielectric layers. Lack of strength makes green tapes susceptible to tearing. Lack of flexibility leads to cracking. Thus, in the preparation of multilayer capacitors and similar devices having thinner dielectric layers, it is essential to produce a thin green tape strong enough to be free-standing and capable of maintaining its physical integrity throughout the processes of ink screen printing, laminating, dicing, etc.

Tapes typically are prepared by tape-casting or knife-coating a slip onto a nonporous carrier. The slip typically contains a ceramic powder, a binder, a wetting agent, a solvent, and a plasticizer, depending on the specific application. A wide variety of materials are used as the binder. For example, Thompson, J. J., in *Ceramic Bulletin*, Vol. 42, pp. 480–1 (1963), discloses the use of organic binders such as methylcellulose, starch derivatives, or preferably polyvinyl alcohol. U.S. Pat. No. 2,736,080 discloses the use of cellulose or cellulose pulp in the production of dielectric sheets having an approximate thickness of 5 mils. U.S. Pat. No. 2,759,854 discloses the use of an ester gum binder in the preparation of green films having a thickness in the neighborhood of 3 mils or less. UK No. 1,493,102 discloses a process for the preparation of glass microchanneled bodies by dipping a filament into a solution of a ceramic powder and a polymeric film-former. Polyvinyl alcohol, polystyrene, ethylcellulose, cellulose nitrate, and dialkoxy polytitanates are listed as suitable film-formers. U.S. Pat. No. 3,495,996 discloses the use of natural gums, synthetic resins, cellulose resinous materials, and the like, in the preparation of encapsulated electronic devices. U.S. Pat. No.3,536,508 discloses the use of binders such as solid ethylcellulose resins, solid polymers of an acrylate or methacrylate ester of a 1–4 carbon aliphatic alcohol, polyvinyl alcohol or polyvinyl butyral as temporary binders for ceramic particles.

U.S. Pat. No. 2,966,719 discloses the preparation of a green ceramic tape having a thickness as thin as on the order of 1 mil using binders such as cellulose acetate butyrate resin compatibly plasticized with dimethyl phthalate or tricresyl phosphate, or polyacrylate esters. However, the preparation of said tape requires that the tape be cast onto a flexible support. U.S. Pat. No. 3,619,220 discloses the preparation of a fired ceramic having a thickness of approximately 1 mil using ethylcellulose as a binder. However, the product is fired on a glass plate and is not taught to be free-standing.

U.S. Pat. No. 2,486,410 discloses an early process for the preparation of flat ceramic plates using binders such as ethylcellulose. The resulting tapes are described as being "leather-hard."

U.S. Pat. No. 3,189,978 discloses a process for the preparation of multilayer circuits by first preparing a plurality of dry, thin films, each comprising finely divided ceramic particles and a heat-volatile binder therefor. Said patent discloses that a film having a thickness of about 1 mil is flexible and strippable from the carrier upon which it was cast. The binder was vinyl chloride-acetate copolymer. A metal-containing ink is applied to the previously described film. The metal ink is taught to contain binders such as methylcellulose, ethylcellulose, or nitrocellulose. The patent broadly teaches that the thickness of unfired ceramic films may be varied between about 0.5 and 20 mils.

U.S. Pat. No. 4,447,853 discloses the preparation of multilayer capacitors having individual dielectric layers of from 10 to 30 microns in thickness. The only statement in said patent regarding the binder is that "the manufacturing method of the multilayer capacitor is the same as the prior art method."

Heretofore, a flexible, strong, thin, free-standing, ceramic green tape having a thickness of less than about 10 microns (ca. 0.4 mils) has not been disclosed. Nor has it been disclosed that the use of ethylcellulose having specific properties is especially advantageous in the preparation of such a tape. Such a tape would be desirable for the preparation of improved multilayer capacitors and related devices.

SUMMARY OF THE INVENTION

The present invention is a green ceramic precursor tape comprising a free-standing, flexible layer having a thickness of from about 5 to about 100 microns and prepared from a slip composition comprising:

(a) a dielectric component; and
(b) a binder comprising ethylcellulose having an ethoxyl content of from about 48 percent to about 49.5 percent, and a viscosity of from about 30 to about 60 cps, the viscosity being that of a 5 weight percent solution measured at 25° C. in an Ubbelohde viscometer with a solvent which is 80 weight percent toluene and 20 weight percent ethanol.

Surprisingly, the use of specific ethylcellulose binders as described herein, allows the production of improved free-standing, flexible, thin, green tapes. The present invention includes capacitors prepared using such green tapes.

DETAILED DESCRIPTION OF THE INVENTION

According to the present invention, a slip comprising a dielectric component, a binder, a solvent, a surfactant, and, optionally, a plasticizer, advantageously is prepared. Conventional methods of formulating or compounding this slip can be employed so long as it is thoroughly mixed to form a homogeneous suspension. The slip is deposited on a nonporous carrier using known methods such as, for example, the falling sheet method as taught in, e.g., U.S. Pat. No. 3,717,487, or the well-known tape-casting, doctor blade or knife-coating techniques. For example, U.S. Pat. Nos. 3,189,978; 2,486,410; and 2,966,719 describe methods of casting green tapes, and the teachings of said patents relating to the preparation of green tapes is incorporated herein by reference. In general, the tape-casting technique involves applying a thin layer of a slip to a flexible or nonflexible, nonporous carrier, drying and deairing the resulting film, and recovering the dried tape.

The dielectric component of the slip can be a dielectric powder, a material which upon firing is converted into a dielectric, or a mixture thereof. Dielectric materials are well-known, and a wide variety of dielectric materials can be employed. Examples of dielectric powders include powders consisting mainly of alumina, zircon, aluminum silicate, zirconium dioxide, titanium dioxide, magnesium silicate, and, preferably, barium titanate. Typically, the ceramic component is ground to a fine particle size ranging from about 0.05 to about 5 microns. Preferably, dielectric powders having an average particle size of from about 0.5 to about 2 microns are employed.

Generally, the binder serves to retain the ceramic component in an undisrupted position after the solvent is evaporated from the slip and, together with the solvent and wetting agent, facilitates the formation of dry, flexible green tapes which are free of pinholes, cracks and other imperfections. Preferred binders include ethylcellulose and thermoplastic methylcellulose. Thermoplastic methylcellulose is prepared according to the methods described in U.S. Pat. Nos. 3,070,451; 2,965,508; 2,958,607; 2,849,328; and 2,839,419; all of which are incorporated herein by reference. Preferred ethylcellulose binders have a viscosity of from about 40 to about 50 centipoise. Especially preferred binders are ethylcellulose compositions having an ethoxyl content of from about 48 to about 49.5 weight percent, and a viscosity of about 45 cps, the viscosity being that of a 5 weight percent solution measured at 25° C. in an Ubbelohde viscometer with a solvent which is 80 weight percent toluene and 20 weight percent ethanol. Premium standard ETHOCEL® 45 (ETHOCEL is a trademark of The Dow Chemical Company) brand ethylcellulose is the most preferred binder, as it has a low sodium chloride content and meets the requirements specified hereinabove; ETHOCEL 45 is available from The Dow Chemical Company. Mixtures of binders can be employed.

ETHOCEL 45 is chosen because of its toughness and unusual degree of flexibility. It has good suspending properties for the highly dense dielectric powder. The presence of some hydroxyl groups on the cellulose backbone increases the interaction and dispersion of the metal oxide in the vehicle. Moreover, the permeability of cellulose ethers to $O_2$, $CO_2$ and $H_2O$ are orders of magnitude higher than acrylates allowing proper diffusion of gases upon burnout or firing.

The solvent functions to solubilize all components of the slip which are volatile under ceramic firing conditions. Examples of typical solvents include toluene, ethanol, butanol, acetone, methylisobutyl ketone, methyl ethyl ketone, isopropanol, diacetone alcohol, benzene, and the like. Mixtures of solvents, such as mixtures of methyl ethyl ketone and ethanol, are preferred. Water can be employed as the solvent when thermoplastic methylcellulose is employed as the binder.

A wetting agent, or surfactant, is advantageously employed in the slip composition. The surfactant facilitates the formation of homogeneously uniform slips having desirable spreadability. Surfactants are well-known and a wide variety of surfactants can be employed. Examples of typical wetting agents or surfactants include the amine salts of alkylaryl sulfonates; the alkyl ethers of polyethylene glycol, such as the ethyl ether of polyethylene glycol; alkylaryl polyether alcohols, such as ethylphenyl glycol; polyoxyethylene acetate, or other polyoxyethylene esters; and the like. The surfactant or wetting agent preferably is of such a nature that it is volatilized during firing.

A plasticizer is optionally employed in the slip composition. Plasticizers are well-known and a wide range of plasticizers can be employed. Examples of typical plasticizers include glycols, such as propylene glycol; phthalic esters such as dioctyl phthalate and benzyl butyl phthalate; and long chain aliphatic acids such as oleic acid and stearic acid. The plasticizer serves to enhance the film-forming characteristics of the slip, and to impart flexibility into the green tape at lower temperatures. Preferably, more than one plasticizer is employed. For example, a preferred plasticizer mixture comprises benzyl butyl phthalate, propylene glycol, and oleic acid.

A typical slip composition can have the following ranges of components:
dielectric component from about 35 to about 95;
binder from about 1 to about 10;
solvent from about 5 to about 70;
surfactant from about 0 to about 5; and
plasticizer from about 0 to about 10 weight parts.
Preferred slip compositions have the following compositions:
dielectric component from about 40 to about 80;
binder from about 2 to about 6;
solvent from about 20 to about 60;
surfactant from about 0.01 to about 1; and
plasticizer from about 1 to about 6 weight parts.

Preferred slip compositions have relatively higher amounts of ceramic powders with relatively lower amounts of organic binders and solvent. However, a green tape needs a certain minimum amount of organic binder to maintain a mechanical strength as a free-standing tape, and a slip typically has a minimal amount of solvent to retain the rheological properties for tape-casting.

Desirably, the slip of the present invention is formulated to have a viscosity which is suitable for the chosen method of applying the slip to a carrier. For example, typical slip compositions used in tape-casting have a viscosity of from about 400 to about 3,000 cps at 25° C. Slips of the desired viscosity and homogeneity are cast or coated into green tapes using methods well-known in the art.

The green tapes of the present invention can be formed into multilayer capacitors and similar electronic devices using known techniques. For example, green tapes of the present invention can be coated, e.g., by screen stenciling, with a noble metal electrode coating in the desired pattern. The inked tapes can then be stacked to provide alternate dielectric and electrode layers with alternate electrode layers exposed on opposite edges of the stack. The stack can then be compressed under pressure, as is known in the art, and then fired to provide a monolithic multilayer capacitor. The edges with exposed electrodes are metalized with a conductive metal paint. This can be done before the stack is fired, or after such firing, depending upon the firing temperature required and the metal paste utilized. See U.S. Pat. No. 4,075,681, which is incorporated herein by reference, for an exemplary method of preparing monolithic multilayer capacitors.

Preferred green tapes have a thickness of up to about 10 microns; most preferably they have a thickness of from about 5 to about 10 microns.

SPECIFIC EMBODIMENTS

The following preparations and examples are illustrative of the present invention, and are not to be construed as limiting. All parts and percentages are by weight unless otherwise specified.

EXAMPLE 1 AND COMPARATIVE EXPERIMENTS 1-3

A powder suspension is prepared by dispersing in toluene a commercial dielectric powder designated Z5UBL702, available from Solid State Dielectrics Company, Sun Valley, Calif. The suspension is stirred constantly.

The following general procedure is followed for Example 1 and comparative Experiments 1-3. An aliquot of the suspension described hereinabove is weighed out. The aliquot is allowed to settle for thirty (30) minutes. Then, the supernatant liquid is siphoned off to enrich the suspension so that it contains approximately a 1:1 weight ratio of powder and toluene. The enriched suspension is vigorously mixed with an ethylcellulose solution prepared using a mixture of toluene, isopropanol, and plasticizers. Four different types of ethylcellulose are employed, i.e., four slips are prepared. Each slip is cast on a glass plate using a doctor blade. The cast suspensions are dried to give green tapes having thicknesses of from 0.3 to 1.2 mils (7.6-30.5 microns). The results are summarized in Table I.

TABLE 1

| Run[4] | Binder used[1] | Binder viscosity[1] | Ceramic powder (g) | Plasticizers (g) DOP[2] | PG[3] | Binder (g) | Solvent toluene | isopropanol | Dry Tape Properties |
|---|---|---|---|---|---|---|---|---|---|
| C.E. 1 | E-7 | 7 cps | 53.3 | 3.3 | 0.67 | 12.5 | 69.2 | 15.6 | Mud Cracks |
| C.E. 2 | E-20 | 20 cps | 33.3 | 2.1 | 0.42 | 6.3 | 53.1 | 11.9 | Mud Cracks |
| Ex. 1 | E-45 | 45 cps | 41.8 | 1.93 | 0.07 | 6.3 | 60.6 | 2.3 | Good Film |
| C.E. 3 | E-100 | 100 cps | 5.74 | 0.28 | 0.07 | 3.3 | 14.1 | 3.2 | Curled on the glass surface |

[1]All binders used are ETHOCELS which are ethylcellulose products available from The Dow Chemical Company. Binder viscosity is measured as described hereinabove.
[2]Dioctyl phthalate
[3]Propylene glycol
[4]C.E. equals Comparative Experiment.

Surprisingly, the green tape prepared using ETHOCEL 45 is more suitable for use in preparing dielectric components than are green tapes prepared using the other ETHOCEL products tested.

EXAMPLE 2

A slip having the following composition (in grams) is prepared:

| | |
|---|---|
| Dielectric Ceramic powder | 800.0 g |
| ETHOCEL 45 | 68.0 g |
| Surfactant | 4.0 g |
| Plasticizer | |
| benzyl butyl phthalate | 46.4 g |
| butanetriol | 3.6 g |
| Solvent | |
| methyl ethyl ketone | 486.0 g |
| isopropanol | 93.6 g |
| ethanol | 96.0 g |
| Total | 1597.6 g |

In the preparation of the slip, the dielectric powder is ball-milled in a mixture of methyl ethyl ketone and isopropanol for six hours using three-eighths-inch zirconia balls. ETHOCEL 45 is dissolved separately in a mixture of methyl ethyl ketone and isopropanol together with benzyl butyl phthalate and butanetriol. The ETHOCEL solution is then poured into the mill jar, and total slip is milled for an additional twenty hours. The viscosity of the slip is 800 cps. It is cast on a glass plate using a doctor blade. The cast slip is dried to give a green tape having a thickness of 0.3 mil (7.6 microns). The tape easily peels off the glass plate and is observed to have good mechanical strength.

EXAMPLE 3

The slip of Example 2 is cast on a polypropylene tape using a doctor blade. The cast slip is dried to give a dry green tape having a thickness of 0.9 mil (22.9 microns). The dry green tape is stripped continuously from the substrate tape. Rectangular-shaped two-inch by four-inch sheets are punched out of the green tape and are screen-printed with a palladium-containing electrode ink. About 20 layers of sheets with electrode are stacked and backed up with 10 blank sheets on either side to increase the integrity of the resulting laminate. The laminate is hot pressed at 70° C. and 2,500 psig. Green chips diced out of the laminates are subjected to polymer burnout and sintering. Good ceramic chips are obtained with no delamination. Dielectric properties of the chips are within the specifications of Z5U as determined by the Electronic Industries Association.

Surprisingly, it can be seen from the preceding examples and comparative experiments that the use of specific ethylcellulose binders results in very thin, green tapes having outstanding physical properties, whereas the use of ethylcellulose binders not within the specifications described herein does not give green tapes having the desired physical properties.

What is claimed is:

1. A ceramic precursor tape comprising a free-standing, flexible layer having a thickness of from about 5 to about 100 microns and prepared from a slip composition comprising:
    (a) a dielectric component; and (b) a binder comprising ethylcellulose having an ethoxyl content of from about 48 to about 49.5 weight percent, and a viscosity of from about 30 to about 60 cps, the viscosity being that of a 5 weight percent solution measured at 25° C. in an Ubbelohde viscometer with a solvent which is 80 weight percent toluene and 20 weight percent ethanol.

2. A tape of claim 1 wherein the dielectric component is a dielectric powder.

3. A tape of claim 1 wherein the dielectric component comprises barium titanate.

4. A tape of claim 3 having a thickness of less than about 10 microns.

5. A tape of claim 1 wherein the binder comprises ETHOCEL 45 ethylcellulose.

6. A tape of claim 5 having a thickness of less than about 10 microns.

7. A tape of claim 1 having a thickness of less than about 10 microns.

8. A capacitor prepared using a green tape of claim 1.

9. A green tape suitable for conversion into a ceramic article, the green tape comprising a free-standing, flexible layer having a thickness of less than about 10 microns, the green tape being prepared from a slip comprising:
(a) a dielectric component; and
(b) a binder comprising at least one of ethylcellulose or thermoplastic methylcellulose.

10. A tape of claim 9 wherein the dielectric component comprises a dielectric powder.

11. A tape of claim 9 wherein the dielectric component comprises a metal titanate.

12. A tape of claim 9 wherein the dielectric component comprises barium titante.

13. A tape of claim 9 wherein the binder is ethylcellulose.

14. A capacitor prepared using a green tape of claim 9.

15. A capacitor prepared using a green tape, the slip comprising:
(a) a dielectric component;
(b) a binder;
(c) a solvent; and optionally,
(d) a plasticizer; and, optionally,
(e) a surfactant or wetting agent,
the improvement comprising the use of a binder comprising an ethylcellulose having an ethoxyl content of from about 48 to about 49.5 weight percent, and a viscosity of from about 30 to about 60 cps, the viscosity being that of a 5 weight percent solution measured at 25° C. in an Ubbelohde viscometer with a solvent which is 80 weight percent toluene and 20 weight percent ethanol.

16. A capacitor of claim 15, the slip comprising ETHOCEL 45 brand ethylcellulose.

17. A capacitor of claim 15 wherein the dielectric component comprises barium titanate.

18. A capacitor of claim 15 prepared using a slip wherein the binder is ETHOCEL 45, and the dielectric component comprises barium titanate.

19. A capacitor of claim 15, prepared using a slip wherein the dielectric component comprises barium titanate, the solvent comprises toluene, methyl ethyl ketone, ethanol and propanol, the surfactant comprises an amine salt of an alkylaryl sulfonate, and the plasticizer comprises oleic acid and benzyl butyl phthalate.

20. A green tape suitable for conversion into a ceramic article, the green tape comprising a free-standing, flexible layer having a thickness of less than 10 microns, the green tape being prepared from a slip comprising:
(a) a dielectric component; and
(b) a binder comprising ethylcellulose, wherein the ethylcellulose has an ethoxyl content of from about 48 to about 49.5 weight percent.

* * * * *